United States Patent

Austin et al.

[15] 3,706,038

[45] Dec. 12, 1972

[54] PULSE TRANSMITTER INCLUDING MEANS FOR CONTROLLING THE AMPLITUDE AND PHASE OF OUTPUT PULSES

[72] Inventors: Frederick H. Austin; Jimmy D. Rogers; Joseph J. Wormser, all of Dallas, Tex.

[73] Assignee: LTV Electrosystems, Inc., Dallas, Tex.

[22] Filed: May 26, 1970

[21] Appl. No.: 41,701

Related U.S. Application Data

[63] Continuation-in-part of Ser. No. 663,796, Aug. 28, 1967, abandoned.

[52] U.S. Cl. ..................................................325/164

[51] Int. Cl. ................................................H04b 1/04

[58] Field of Search ......307/284; 325/164, 141, 161, 325/105, 170, 58, 38; 179/15 BS; 178/67

[56] References Cited

UNITED STATES PATENTS

| | | | |
|---|---|---|---|
| 3,418,581 | 12/1968 | Kennedy et al | 325/141 |
| 3,430,153 | 2/1969 | Bladen | 325/170 |
| 2,883,524 | 4/1959 | Diese et al | 325/164 |
| 3,206,614 | 9/1965 | Wright | 307/284 |
| 2,401,618 | 6/1946 | Crosby | 325/141 |
| 3,551,884 | 12/1970 | Shear et al | 325/40 |
| 3,256,389 | 6/1966 | Ehrich | 325/40 |

*Primary Examiner*—Robert L. Griffin
*Assistant Examiner*—Barry L. Leibowitz
*Attorney*—James D. Willborn

[57] ABSTRACT

A transmission system for transmitting pulses of radio frequency energy includes a radio frequency amplifier output stage, and a source of pulses connected to the input of the amplifier stage. The output signals of the amplifier stage are modulated by means of a modulator connected to modulate the output current of the amplifier. The modulating signals is synchronized with the input pulses.

8 Claims, 2 Drawing Figures

Figure 1:
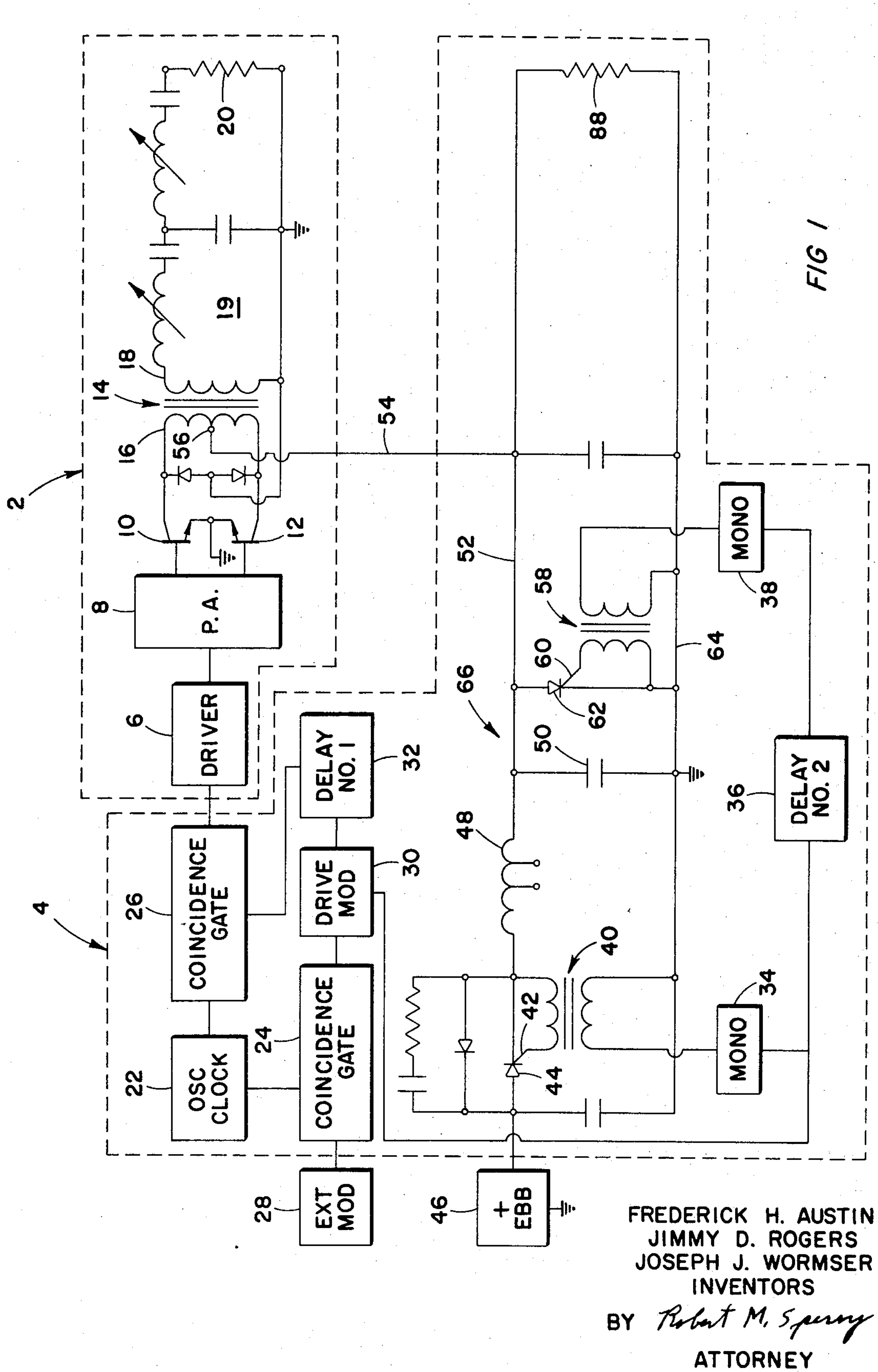

FREDERICK H. AUSTIN
JIMMY D. ROGERS
JOSEPH J. WORMSER
INVENTORS
BY Robert M. Sperry
ATTORNEY FREDERICK H. AUSTIN
JIMMY D. ROGERS
JOSEPH J. WORMSER
INVENTORS
BY Robert M. Sperry
ATTORNEY

PULSE TRANSMITTER INCLUDING MEANS FOR CONTROLLING THE AMPLITUDE AND PHASE OF OUTPUT PULSES

This application is a continuation of application Ser. No. 663,796, filed Aug. 28, 1967 (now abandoned).

This invention relates to radio frequency transmission and particularly directed to means for modulating the current to the output stage of the power amplifier of a radio frequency transmitter to control the amplitude and phase of pulse signals generated by the transmitter.

In the transmission of high-power, low-frequency radio signals of narrow band-width, such as for LORAN-D radio navigation, the characteristics of the antenna require careful shaping of the modulation envelope and precise control of the carrier phase. Failure to accomplish this can result in high power-losses and generation of undersired signals, such as "key clicks" or "back waves." Numerous techniques for accomplishing these goals have heretofore been proposed. None of the prior-art techniques, however, have been entirely satisfactory. Thus, techniques of keying, or switching, the power input to the primary winding of the output transformer have reduced "key clicks, " but have increased the tendency for "back waves" and result in very large surges of current and voltage in the keying circuit, thus causing severe stresses on circuit components and extreme waste of power. Other systems have employed dissipative shaping-elements in the antenna network, or wave-shaping in low-level stages followed by high-level linear amplifiers. However, both of these techniques are relatively inefficient.

These disadvantages of the prior art are overcome with the present invention, according to which a wave-shaping technique is provided which yields unique control of the amplitude waveform of the modulation of load current while maintaining the degree of phase modulation, during turn-on transition, to a minimum. The technique of the present invention avoids the detrimental effects of excessive energy-storage without reducing the effective information bandwidth and provides a significant improvement in output power capability and precision.

The advantages of the present invention are preferably attained by modulating the collector current of transistors of a switching mode radio-frequency power amplifier and synchronizing the modulator with a radio-frequency gating function.

Accordingly, it is an object of the present invention to provide improved means for controlling the amplitude and phase of high-power, low-frequency radio signals.

Another object of the present invention is to provide means for controlling the amplitude and phase of high-power, low-frequency radio signals without excessive energy storage.

An additional object of the present invention is to provide means for controlling the amplitude and phase of high-power, low-frequency radio signals without reducing the effective information bandwidth.

A further object of the present invention is to provide means for improving the output power capability and precision of high-power, low-frequency radio transmitters.

A specific object of the present invention is to provide means for modulating the collector current to transistors of a switching mode radio-frequency power amplifier and synchronizing the modulator with a radio frequency gating function.

These and other objects and features of the present invention will be apparent from the following detailed description, taken with reference to the figures of the accompanying drawing.

Figure 2:
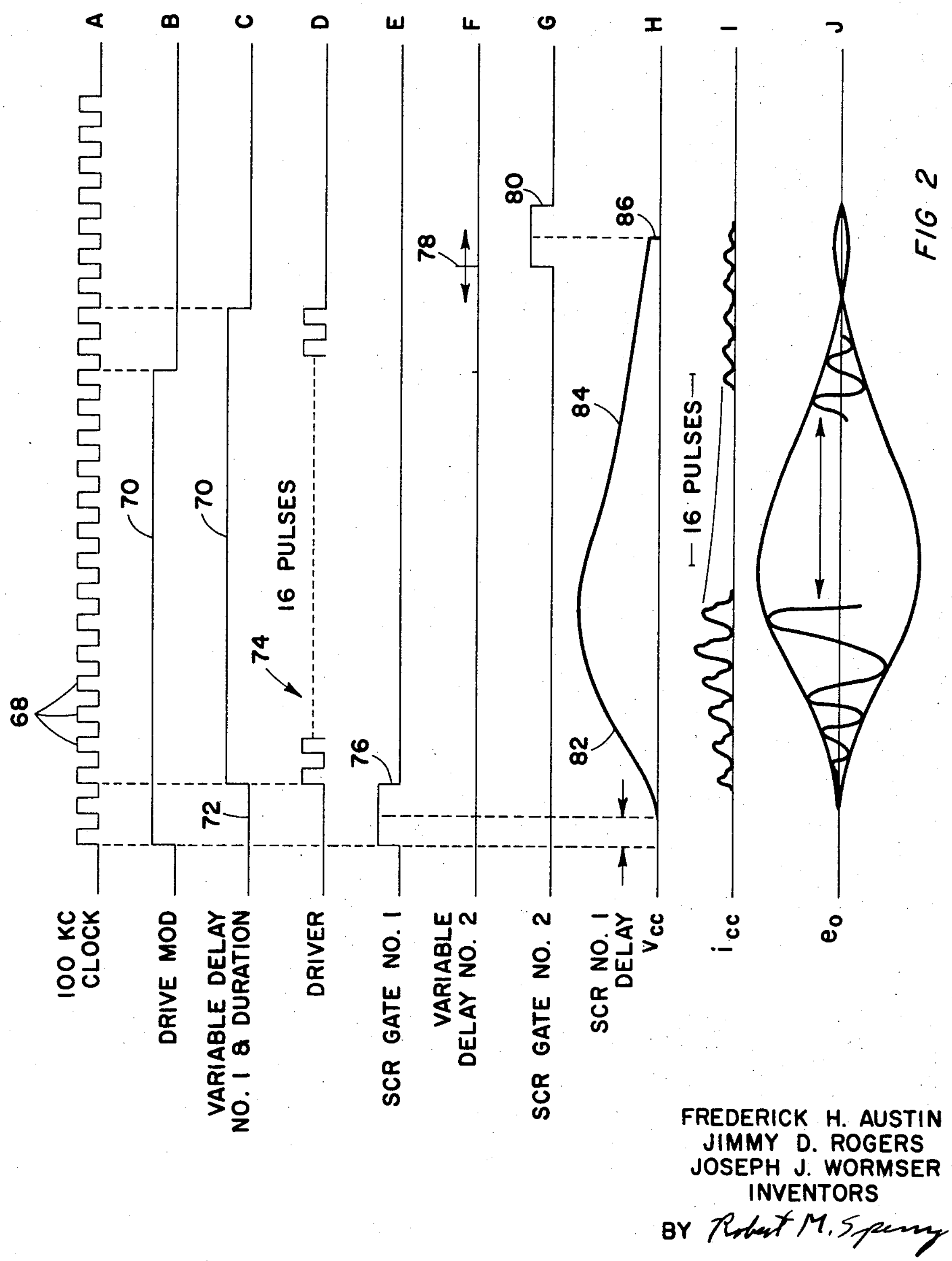

In the drawing:

FIG. 1 is a diagrammatic representation of a high-power, low-frequency radio transmitter embodying the present invention; and FIG. 2 is diagrammatic representation of signal waveforms appearing at indicated portions of the circuit of FIG. 1, displayed as functions of time.

In that form of the present invention chosen for purposes of illustration in the drawing, FIG. 1 shows a transmitter, indicated generally at 2, and an exciter, indicated generally at 4. The transmitter 2 comprises a driver amplifier 6, a Class D radio frequency power amplifier 8 having transistors 10 and 12 connected, in "-push-pull" relation, in the output stage thereof, an output transformer 14 having a primary winding 16 and a secondary winding 18, a filter network 19, and a load circuit 20. The exciter 4 comprises an oscillator clock 22 supplying pulses to a pair of coincidence gates 24 and 26. Coincidence gate 24 also receives signals from an external modulator 28 and, when the signals from modulator 28 are synchronized with the pulses from oscillator 22, gate 24 supplies a timing signal to modulator driver 30. It should be noted that, for some purposes, external modulator 28 may be omitted. It will be obvious to those skilled in the art, that the repetition rate of the pulse bursts from transmitter a will be determined by the pulses from oscillator 22 synchronized in coincidence circuit 24 with the signal from modulator 28 or, when modulator 28 is omitted, by oscillator 22 along. The modulator driver 30 supplies an expanded pulse signal through first delay circuit 32 to coincidence gate 26 and supplies a similar signal to a first monostable multivibrator 34 and, through second delay circuit 36, to a second monostable multivibrator 38. The first monostable multivibrator 34 is coupled through transformer 40 to the control gate 42 of a first silicon-controlled rectifier 44 which is connected in series between a suitable power supply 46 and the collector electrodes of transistors 10 and 12 through the timing circuit, composed of inductor 48 and capacitor 50, leads 52 and 54, and the center-tap 56 of primary winding 16 of transformer 14. Finally, monostable multivibrator 38 is coupled through transformer 58 to the control gate 60 of a second silicon-controlled rectifier 62 which is coupled in parallel relation with the collector electrodes of transistors 10 and 12 between leads 52 and 64. Silicon-controlled rectifier 44, inductance 48, capacitor 50, and silicon-controlled rectifier 62 cooperate to form a collector modulator, as indicated generally by 66.

In operation, the oscillator clock 22 generates a plurality of successive pulses, as indicated at 68 on curve A of FIG. 2, which pulses are supplied to coincidence gate 26 to determine the fundamental frequency of the transmitter 2 and are also supplied, through coincidence gate 24, to the modulator driver 30 to provide a phase-coherent reference for synchronizing the modulating signals with the carrier signal emitted by the transmitter 2. As indicated above, the coincidence gate 24 serves to synchronize the pulses from oscillator 22 and the external modulator 28 and may be eliminated in those instances where external modulation is not required. The modulator driver 30 generates a pulse of expanded width, as seen at 70 on curve B of FIG. 2, which serves to trigger the rest of the circuit. The duration of the expanded pulse 70 is preselected and may be adjusted by the operator in a conventional manner to determine the duration of the transmission of transmitter 2. The expanded pulse 70 from the modulator driver 30 is supplied to the first time-delay circuit 32, which delays the signal for a preselected period of time, as indicated at 72 on curve C of FIG. 2, and then passes the signal to coincidence gate 26. During the time that the expanded pulse 70 is applied to coincidence gate 26, the gate 26 passes pulses from oscillator 22 to the driver amplifier 6 of transmitter 2, as seen at 74 on curve D of FIG. 2, to cause the transmitter 2 to generate a carrier signal by driving transistors 10 and 12 to saturation at the frequency of the pulses from oscillator 22.

The expanded pulse 70 from the modulator driver 30 is also supplied to the first monostable multivibrator 34, where the leading edge of the expanded pulse 70 is stretched, as seen at 76 on curve E of FIG. 2, and is applied through transformer 40 to the control gate 42 of the first silicon-controlled rectifier 44 to switch rectifier 44 to its conductive condition. Once switched, rectifier 44 passes current from power supply 46 through inductance 48 to charge capacitor 50 and continues to conduct until the voltage drop across capacitor 50 exceeds the voltage of power supply 46; whereupon, rectifier 44 returns to its non-conductive condition, pending receipt of the next pulse 76 from multivibrator 34.

In addition, the expanded pulse 70 is applied to the second delay circuit 36, which is activated by the trailing edge of the expanded pulse 70 and, after a preselected time interval, passes a triggering pulse, as indicated at 78 on curve R on FIG. 2, to the second monostable multivibrator 38. The second multivibrator 38 stretches the triggering pulse 78, as seen at 80 on curve G of FIG. 2, and supplies it through transformer 58 to the control gate 60 of the second silicon-controlled rectifier 62 to switch rectifier 62 to its conductive condition. When the first rectifier 44 becomes conductive, capacitor 50 begins to charge rapidly, as indicated at 82 on curve H of FIG. 2. When the voltage across capacitor 50 exceeds that of power supply 46, rectifier 44 switches to its non-conductive state and capacitor 50 begins to discharge, as shown at 84 on curve H of FIG. 2. After a time-interval determined by the duration of the expanded pulse 70 plus the delay provided by the second time-delay circuit 36, the second rectifier 62 is made conductive and provides a shunt for any charge remaining on capacitor 50. Rectifier 62 returns to its non-conductive state when the voltage across capacitor 50 reaches zero, as seen at 86 on curve H of FIG. 2.

The charge on capacitor 50, represented by curve H of FIG. 2, corresponds to the shape and magnitude of the modulation to be impressed on the transmitter 2 and is applied through leads 52 and 54 and the center-tap 56 of primary winding 16 of transformer 14 to the collector electrodes of transistors 10 and 12 to vary the magnitude of the collector current flowing through transistors 10 and 12, as seen at curve I of FIG. 2, and to cause the power amplifier 8 to emit an amplitude-modulated signal, as seen at curve J of FIG. 2. Transformer 14 is designed with sufficient bandwidth to combine efficiently the voltage wave-forms from each side of the primary winding 16 into a single, high-quality, square wave in the secondary winding 18. Filter 19 is a low-pass filter which suppresses harmonic currents while efficiently passing the fundamental current to the load 20. Where the radio-frequency loading does not offer sufficient shaping, a suitable loading resistor may be provided, as seen at 88 in FIG. 1.

While the invention has been described above with respect to transistors, it will be apparent to those skilled in the art, that similar results could be obtained in a circuit employing vacuum tubes in the output stage of the power amplifier, instead of transistors 10 and 12, by connecting the respective ends of the primary winding 16 of transformer 14 to the anode electrodes of such vacuum tubes.

In addition, numerous other variations and modifications may obviously be made without departing from the present invention. Accordingly, it should be clearly understood that the form of the present invention described above and shown in the figures of the accompanying drawing is illustrative only and is not intended to limit the scope of the invention.

What is claimed is:

1. Apparatus for broadcasting modulated radio frequency signals, said apparatus comprising:
- transmitter means including a radio frequency power amplifier having a pair of amplifying components each having an output current electrode,
- oscillator means connected to supply pulse-type signals to said transmitter to cause said transmitter to emit a carrier signal having a frequency corresponding to that of said pulse type signals, and
- modulator means connected to said output current electrodes and operable to modulate the flow of current to said electrodes, said modulator means comprising: a timing circuit consisting of an inductor and a capacitor and having the output of said circuit connected to said output current electrodes, a power supply, a first silicon-controlled rectifier connected in series between said power supply and said timing circuit to control the flow of current to said electrodes, a second silicon-controlled rectifier connected in shunt with said capacitor and means for switching said rectifiers between their non-conductive and conductive states.

2. The apparatus of claim 1 wherein said means for switching said rectifiers comprises:
- a modulator driver connected to receive said pulse-type signals from said oscillator means and to establish an expanded pulse signal having a pulse width equal to the time required to receive a preselected number of said pulse-type signals,
- a first monostable multivibrator connected to receive said expanded pulse signal and having the output of said first multivibrator coupled to the control gate of said first rectifier to control switching of said first rectifier, first delay means connected to receive said expanded pulse signal and responsive thereto to emit a pulse-type signal at a preselected time interval following receipt of said expanded pulse signal, and a second monostable multivibrator connected to receive said pulse-type signal from said first delay means and having the output of said second multivibrator coupled to the control gate of said second rectifier to control switching of said second rectifier.

3. The apparatus of claim 2 wherein: said first multivibrator is responsive to the receipt of the leading edge of said expanded pulse to switch said first rectifier from a non-conductive to a conductive state, and said rectifier is responsive to the voltage across the capacitor of said timing circuit exceeding the voltage of said power supply by switching from a conductive to a non-conductive state.

4. The apparatus of claim 2 wherein: said second multivibrator is responsive to said pulse-type signal from said first delay means to switch said second rectifier from a non-conductive to a conductive state, and said second rectifier is responsive to a condition of zero voltage across said capacitor of said timing circuit by switching from a conductive state to a non-conductive state.

5. The apparatus of claim 2 further comprising: second delay means connected to receive said expanded pulse signal from said modulator driver and operable to pass said expanded pulse signal after a preselected time interval, and a first coincidence gate connected to receive said pulse-type signals from said oscillator means and said expanded pulse signal from said second delay means and to pass said pulse-type signals to said transmitter only when coincidence exists between said pulse-type signals and said expanded pulse signal.

6. Apparatus for broadcasting modulated radio frequency signals, said apparatus comprising, transmitter means including a radio frequency power amplifier having an amplifying device with an output current electrode, a source of oscillations connected to supply pulse-type signals to said transmitter to cause said transmitter to emit a carrier signal having a frequency corresponding to that of said pulse type signals and in phase synchronism therewith, means connected to said source for generating a modulating driving pulse phase synchronized with said oscillations and having a pulse width greater than said pulse-type signals, a source of operating current for said transmitter means connected to supply operating current to said amplifying device, said source of operating current comprising energy storage means, means for charging said energy storage means, and means responsive to said leading edge of said driving pulse for discharging said energy storage means to supply operating current to said amplifying device, whereby said operating current is in phase synchronism with said pulse-type signal.

7. The apparatus of claim 6 wherein said power amplifier is a Class D amplifier.

8. The apparatus of claim 6 further comprising means responsive to the trailing edge of said driving pulse for inhibiting discharge of said energy storage means.

* * * * *